No. 753,618. PATENTED MAR. 1, 1904.
J. H. NORQUIST.
POWER HAMMER.
APPLICATION FILED NOV. 4, 1903.
NO MODEL.
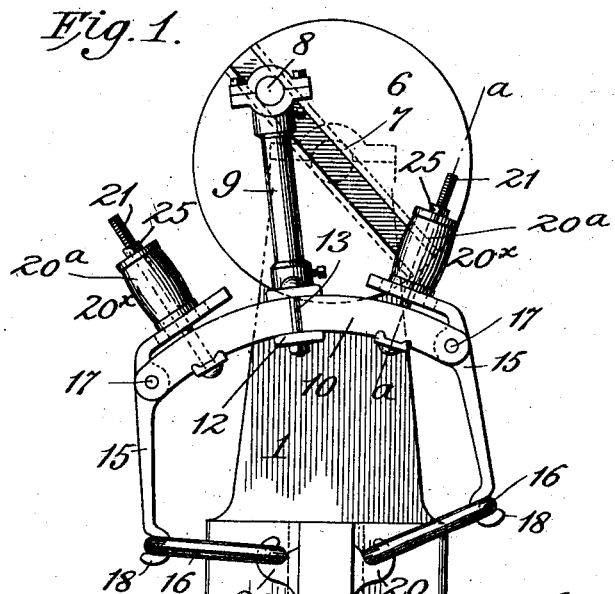
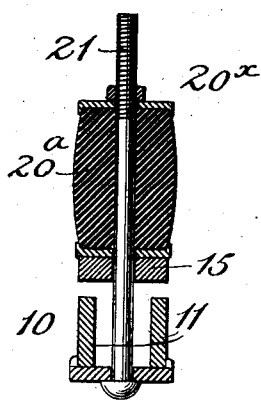
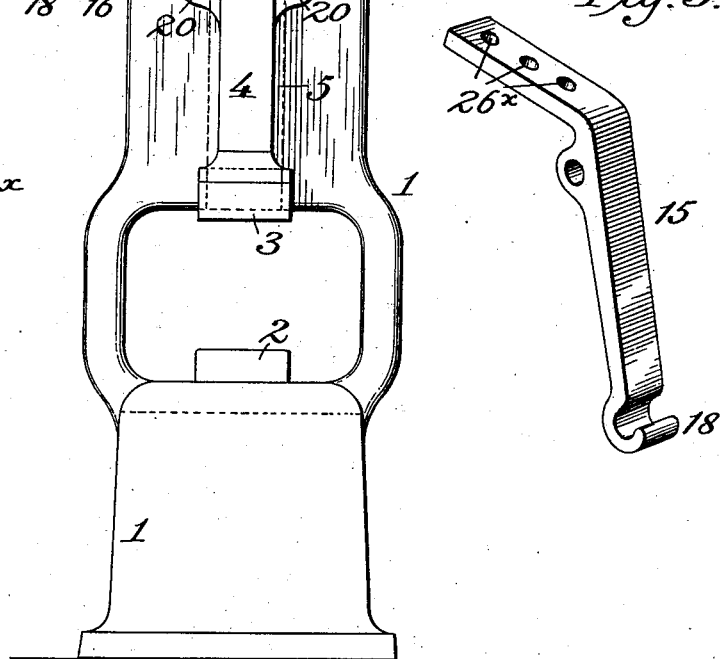
Witnesses
Inventor
J. H. Norquist
by Phil T. Dodge
Attorney
THE NORRIS PETERS CO., PHOTO-LITHO., WASHINGTON, D. C.

No. 753,618. Patented March 1, 1904.

UNITED STATES PATENT OFFICE.

JOHN H. NORQUIST, OF MOLINE, ILLINOIS, ASSIGNOR TO WILLIAMS, WHITE & COMPANY, A CORPORATION OF ILLINOIS.

POWER-HAMMER.

SPECIFICATION forming part of Letters Patent No. 753,618, dated March 1, 1904.

Application filed November 4, 1903. Serial No. 179,809. (No model.)

*To all whom it may concern:*

Be it known that I, JOHN H. NORQUIST, of Moline, county of Rock Island, and State of Illinois, have invented a new and useful Improvement in Power-Hammers, of which the following is a specification.

This invention relates to power-hammers of the type wherein a reciprocating hammer-head coöperates with a fixed anvil; and the invention consists of various improvements directed more particularly to the form and construction of the cushioning element which it is usual in hammers of this type to interpose between the hammer-head and the driving means therefor.

In the accompanying drawings, Figure 1 is a front elevation, partly in section, of my improved hammer. Fig. 2 is a vertical section from front to rear on the line $a\ a$. Fig. 3 is a perspective view of one of the cushioning-levers.

Referring to the drawings, 1 represents an upright frame sustaining near its base a fixed anvil 2, with which coöperates a hammer-head 3, fixed to the lower end of a hammer-slide 4, mounted to reciprocate vertically in guideways 5, formed on the frame above the anvil.

6 represents a wrist-plate which is fixed to a horizontal driving-shaft 7, mounted in bearings at the upper end of the frame and receiving motion from any suitable source of power. The wrist-plate is provided with a crank-pin 8, on which is loosely mounted the upper end of a connecting-rod 9, whose lower end has fixed to it a cross-head 10, comprising two parallel bars 11, extending side by side with a space between them forming a vertical slot and firmly connected with the connecting-rod by means of a clip-plate 12 and bolts 13, extending through the clip-plate and through a flange on the connecting-rod and serving to firmly clamp and hold the bars of the cross-head fixedly to the connecting-rod. The cross-head is connected at its ends with the hammer-slide by means of cushioning-levers 15 and links 16 in such manner that the hammer-slide will be reciprocated vertically by the rotation of the wrist-plate, but will be allowed a limited relative motion subject to the action of the cushioning-levers. The cushioning-levers are of angular form and have their upper portions extended inward laterally at the upper side of the crosshead and their lower portions extended downward, and they are pivoted at a point between their ends between the two bars of the crosshead at the ends of the same on horizontal axes 17. The lower ends of the cushioning-levers are each formed with a hook 18, in which are engaged the outer ends of the links 16, whose inner ends are loosely engaged in laterally-projecting hooks 20 near the upper end of the hammer-slide. The upper laterally-extending ends of the cushioning-levers are acted on by cushioning members $20^{\times}$, in the present instance in the form of rubber cushions $20^{a}$, seated on the ends of the levers and confined by means of bolts 21, extending through clip-plates seated against the under side of the bars of the cross-head and upwardly between said bars and through the cushions, the upper ends of the bolts being threaded to receive adjusting-nuts 25, by which the tension of the rubber cushions may be varied.

As a result of the construction described, the rubber cushions exert constantly a downward pressure on the lateral ends of the levers and tend to force their lower ends outward, thereby holding the hammer-slide yieldingly at the upper end of the stroke. When the wrist-plate is rotated, the cross-head is moved vertically with it and the hammer-slide is reciprocated vertically in its guides, the blow of the hammer being cushioned by the yielding movement of the cushioning-levers subject to the action of the rubber cushions. In order that the character of the blow given by the hammer may be varied—in other words, in order that the hammer may give a quick light stroke or a long heavy stroke, as desired—I propose to provide for the adjustment of the cushions to and from the axis of the levers. As shown in the drawings, this may be accomplished by forming in the lateral portions of the levers a series of holes $26^{\times}$ to receive the bolts on which the rubber cushions are mounted, so that by setting the bolt, with its cushion, in one or the other of these holes it will act on the lever at corresponding distances from its axis. If the bolt is set in the hole nearest the axis of the lever, the leverage being decreased the hammer will make a long and heavy stroke, whereas if the bolt is set toward the free end of the lever the leverage will be increased and the hammer will make a quick light stroke.

It will be understood, of course, that the rubber blocks may be replaced by spiral springs and, further, that the cross-head may be reciprocated by means other than the wrist-plate, for it may be mounted on the end of a vertically-moving hammer-helve, which may be operated in any appropriate manner familiar to those skilled in the art.

Having thus described my invention, what I claim is—

1. In a power-hammer the combination with a movable hammer-head, of a driving member therefor, means for reciprocating said driving member, a lever pivoted to the driving member and operatively connected with the hammer-head, a cushioning device acting on the lever, and means for adjusting said cushioning device to and from the axis of the lever.

2. In a power-hammer the combination with a hammer-head, of a vertically-reciprocating operating member therefor, cushioning-levers pivoted between their ends to said member, operative connections between the lower ends of the levers and the hammer-head, cushioning-springs acting on the upper ends of the levers, and means for adjusting said cushioning-springs to and from the axes of the levers.

3. In a power-hammer the combination with a vertically-movable hammer-head, of a vertically-movable cross-head, means for operating said cross-head, cushioning-levers pivoted between their ends to the cross-head and formed with upper lateral portions extending along the top of the cross-head and having a plurality of openings, bolts mounted on the cross-head and adapted to be passed through either of the openings in the levers, cushioning members mounted on the bolts and bearing on the lateral ends of the levers, and connections between the levers and the hammer-head.

4. In a power-hammer the combination with a hammer-head, of driving member therefor, a connecting-rod operatively connected with the driving means, a cross-head on the lower end of the connecting-rod, cushioning-levers pivoted between their ends to the cross-head and having their upper portions extended laterally at the upper side of the cross-head, cushioning members sustained by the cross-head and acting on the lateral ends of the levers, and links connecting the lower ends of the levers with the hammer-head.

5. In a power-hammer the combination with the frame, of the rotary wrist-plate mounted thereon, a connecting-rod jointed at its upper end to the wrist-plate, a horizontally-arranged cross-head on the lower end of the connecting-rod, angular cushioning-levers pivoted between their ends to the cross-head, said levers having their upper portions extending laterally at the upper side of the cross-head and their lower portions extending downwardly, cushioning-springs acting on the laterally-extending portions of the levers, a vertically-movable hammer-slide carrying a hammer-head; and links connecting the lower ends of the cushioning-levers with the hammer-slide.

6. In a power-hammer the combination with a reciprocating hammer-head, of a driving member, a cross-head connected with the driving member and adapted to be reciprocated thereby, said cross-head comprising two parallel bars arranged side by side with a space between them, cushioning-levers pivoted between said bars at the ends of the same and provided with upper laterally-extending portions, bolts engaged with the under sides of the bars of the cross-heads and extending upward between said bars and through the lateral portions of the cushioning-levers, cushioning-springs applied to said bolts and bearing on the cushioning-levers, and connections between the hammer-head and the cushioning-levers.

7. In a power-hammer the combination with a vertically-reciprocating cross-head and means for reciprocating the same, of cushioning-levers pivoted between their ends to the ends of said cross-head and having their upper portions extending inward toward each other laterally at the upper side of the cross-head, the lower portions of said cushioning-levers being extended down vertically and provided with hooked ends, cushioning members sustained by the cross-head and bearing on the laterally-extending ends of the cushioning-levers, a hammer-head, a vertically-reciprocating hammer-slide carrying said head and having near its upper end laterally-extended hooks, and links having their outer ends engaged with the hooks of the cushioning-levers and their inner ends engaged with the hooks on the hammer-slide.

In testimony whereof I hereunto set my hand, this 31st day of October, 1903, in the presence of two attesting witnesses.

JOHN H. NORQUIST.

Witnesses:
F. LAWSON,
R. A. DOUGLASS.